(12) United States Patent
Tada

(10) Patent No.: US 8,929,518 B2
(45) Date of Patent: Jan. 6, 2015

(54) INFORMATION PROCESSING SYSTEM, MESSAGE SERVER, AND CONTROL METHOD AND CONTROL PROGRAM THEREOF

(75) Inventor: Junpei Tada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/823,815

(22) PCT Filed: Sep. 2, 2011

(86) PCT No.: PCT/JP2011/004928
§ 371 (c)(1),
(2), (4) Date: May 9, 2013

(87) PCT Pub. No.: WO2012/042747
PCT Pub. Date: Apr. 5, 2012

(65) Prior Publication Data
US 2013/0216033 A1 Aug. 22, 2013

(30) Foreign Application Priority Data
Sep. 30, 2010 (JP) ................................ 2010-223323

(51) Int. Cl.
*H04M 1/64* (2006.01)
*H04M 11/00* (2006.01)
*H04M 1/57* (2006.01)
*H04M 3/42* (2006.01)

(52) U.S. Cl.
CPC ............ *H04M 1/57* (2013.01); *H04M 3/42382* (2013.01); *H04M 2203/654* (2013.01)
USPC ................... 379/88.12; 379/88.23; 379/88.25

(58) Field of Classification Search
USPC ............ 379/67.1, 76, 84, 88.19, 88.2, 88.22, 379/88.25, 142.01, 142.04, 142.06, 142.09, 379/207.04, 207.05, 207.08, 88.12, 88.23
See application file for complete search history.

(56) References Cited

U.S. PATENT DOCUMENTS

| 4,809,321 | A | * | 2/1989 | Morganstein et al. ... | 379/209.01 |
| 4,935,958 | A | * | 6/1990 | Morganstein et al. ........ | 379/372 |
| 6,580,787 | B1 | * | 6/2003 | Akhteruzzaman et al. .......................... | 379/88.22 |
| 6,639,973 | B1 | * | 10/2003 | Wheeler et al. ............ | 379/88.18 |
| 6,766,001 | B1 | * | 7/2004 | Hanson ...................... | 379/88.26 |

(Continued)

FOREIGN PATENT DOCUMENTS

| JP | 2001128247 A | 5/2001 |
| JP | 2001268246 A | 9/2001 |

(Continued)

OTHER PUBLICATIONS

Japanese Office Action for JP Application No. 2010-223323 mailed on Oct. 18, 2013 with English Translation.

(Continued)

*Primary Examiner* — Binh Tieu
(74) *Attorney, Agent, or Firm* — Sughrue Mion, PLLC

(57) ABSTRACT

A system according to the present invention includes a calling terminal that makes a call, a called terminal that can receive the call from the calling terminal, and a message server that stores in advance a plurality of messages correlated with call results to the called terminal from the calling terminal, selects a first message from the plurality of messages on the basis of the call results, and transmit the first message to the called terminal.

15 Claims, 20 Drawing Sheets

(56) References Cited

U.S. PATENT DOCUMENTS

| | | | |
|---|---|---|---|
| 7,761,104 B2* | 7/2010 | Oh | 455/466 |
| 8,126,125 B2* | 2/2012 | Koch | 379/142.06 |
| 8,391,454 B2* | 3/2013 | Canu et al. | 379/142.05 |
| 8,553,864 B2* | 10/2013 | Chatterjee | 379/142.01 |
| 8,559,984 B2* | 10/2013 | Anderl et al. | 455/466 |
| 8,825,024 B2* | 9/2014 | Anderl et al. | 455/414.1 |
| 2003/0169865 A1* | 9/2003 | Oren | 379/207.08 |
| 2004/0235520 A1 | 11/2004 | Cadiz et al. | |
| 2005/0130632 A1* | 6/2005 | Park | 455/414.1 |
| 2009/0110162 A1* | 4/2009 | Chatterjee | 379/93.23 |
| 2010/0172481 A1* | 7/2010 | Canu et al. | 379/142.05 |
| 2014/0011486 A1* | 1/2014 | Anderl et al. | 455/414.1 |

FOREIGN PATENT DOCUMENTS

| | | |
|---|---|---|
| JP | 2002051378 A | 2/2002 |
| JP | 2003-271518 A | 9/2003 |
| JP | 2004350291 A | 12/2004 |
| JP | 2005-32081 A | 2/2005 |
| JP | 2006324791 A | 11/2006 |
| JP | 2007019587 A | 1/2007 |
| JP | 2007251332 A | 9/2007 |

OTHER PUBLICATIONS

The international search report for PCT/JP2011/004928 mailed on Oct. 4, 2011.

* cited by examiner

FIG. 5

| MESSAGE ID | MESSAGE TEXT |
|---|---|
| t-suzuki_message-1 | THANK YOU ALWAYS. THIS IS SUZUKI OF ABC.<br>I WILL CALL YOU AGAIN. |
| t-suzuki_message-2 | THIS IS SUZUKI IN CHARGE OF SALES OF THE PRODUCT XX.<br>PLEASE CALL ME BACK WHEN YOU HAVE TIME. |
| t-suzuki_message-3 | THANK YOU FOR YOUR SPEAKING AWHILE AGO DESPITE BEING BUSY.<br>PLEASE DO NOT HESITATE TO CONTACT THE FOLLOWING<br>IF YOU HAVE ANY QUESTION. |
| j-yamada_message-1 | THANK YOU ALWAYS. THIS IS YAMADA OF ABC.<br>PLEASE CLICK THE FOLLOWING URL WHEN YOU HAVE TIME.<br>http://MessageServer?user=j-yamada&callnumber=09055557777 |
| ⋮ | ⋮ |
| t-suzuki_message-11 | THIS IS SUZUKI IN CHARGE OF SALES OF THE PRODUCT XX.<br>PLEASE CLICK THE FOLLOWING URL WHEN YOU HAVE TIME.<br>http://xxxxxxxxx |
| t-suzuki_message-12 | THIS IS SUZUKI IN CHARGE OF SALES OF THE PRODUCT XX.<br>PLEASE CALL ME BACK THROUGH THIS NUMBER 03-xxxxx-xxxx. |
| t-suzuki_message-13 | THANK YOU FOR YOUR SPEAKING A WHILE AGO DESPITE BEING BUSY.<br>PLEASE DO NOT HESITATE TO CONTACT ME THROUGH THE NUMBER<br>03-xxxxx-xxxx IF YOU HAVE ANY QUESTION. |
| j-yamada_message-14 | NO SETTING |
| ⋮ | ⋮ |

FIG. 6

| | 423 | | | | | | | |
|---|---|---|---|---|---|---|---|---|
| USER ID | COM-PANY ID | DIVISION ID | FAMILY NAME | FIRST NAME | MOBILE PHONE ADDRESS | PC ADDRESS | EXTERNAL TELEPHONE NUMBER | EXTENSION NUMBER |
| 601 → t-suzuki | abc | abc-eigyou | SUZUKI | TARO | t-szk@xxx.ne.jp | t-szk@neo.com | 09012345678 | 81112222 |
| 602 → j-yamada | abc | abc-kaihatsu | YAMADA | JIRO | j-ymd@xxx.ne.jp | j-ymd@nec.com | 09023456789 | 82223333 |
| ... | | | ... | ... | ... | ... | ... | ... |

FIG. 7

| USER ID | MESSAGE TRANSMISSION CONDITION | OUTSIDE-COMPANY MESSAGE | | INSIDE-COMPANY MESSAGE | |
|---|---|---|---|---|---|
| | | TRANSMISSION MESSAGE ID | WHETHER OR NOT THERE IS RETRANSMISSION CONFIRMATION URL | TRANSMISSION MESSAGE ID | WHETHER OR NOT THERE IS RETRANSMISSION CONFIRMATION URL |
| t-suzuki | NO RESPONSE/BUSY | t-suzuki_message-1 | TRUE | t-suzuki_message-2 | FALSE |
| t-suzuki | TALKING ESTABLISHED (AFTER TALKING) | t-suzuki_message-3 | FALSE | NO | FALSE |
| t-suzuki | CONNECTION TO ANSWERING MACHINE (AFTER TALKING) | t-suzuki_message-1 | TRUE | t-suzuki_message-2 | FALSE |
| j-yamada | NO RESPONSE/BUSY | NO SETTING | FALSE | NO SETTING | FALSE |
| j-yamada | TALKING ESTABLISHED (AFTER TALKING) | NO SETTING | FALSE | NO SETTING | FALSE |
| j-yamada | CONNECTION TO ANSWERING MACHINE (AFTER TALKING) | NO SETTING | FALSE | NO SETTING | FALSE |
| ... | ... | ... | ... | ... | ... |

FIG.13A

| MESSAGE ID | MESSAGE TEXT |
|---|---|
| abc-eigyou_message-1 | THANK YOU ALWAYS. THIS IS THE SALES DIVISION OF ABC. I WILL LET THE PERSON IN CHARGE IN THE SALES DIVISION OF OUR COMPANY CALL YOU AGAIN. |
| abc-eigyou_message-2 | THIS IS THE SALES DIVISION. PLEASE CALL OUR DIVISION BACK WHEN YOU HAVE TIME. |
| abc-kaihatsu_message-1 | THANK YOU ALWAYS. THIS IS THE DEVELOPMENT DIVISION OF ACB. I WILL LET THE PERSON IN CHARGE IN THE DEVELOPMENT DIVISION OF OUR COMPANY CALL YOU AGAIN. |
| abc-kaihatsu_message-2 | THIS IS THE DEVELOPMENT DIVISION. PLEASE CALL OUR DIVISION BACK WHEN YOU HAVE TIME. |
| ⋮ | ⋮ |
| abc_message-1 | THANK YOU ALWAYS. THIS IS ABC. I WILL LET THE PERSON IN CHARGE IN OUR COMPANY CALL YOU AGAIN. |
| def_message-1 | THANK YOU ALWAYS. THIS IS DEF COMPANY. I WILL LET THE PERSON IN CHARGE IN OUR COMPANY CALL YOU AGAIN. |
| ⋮ | ⋮ |

424

1301 { (rows abc-eigyou_message-1 through kaihatsu rows)

1302 { (rows abc_message-1, def_message-1, ...)

FIG.13B

| | DIVISION ID | MESSAGE TRANSMISSION CONDITION | OUTSIDE-COMPANY TRANSMISSION MESSAGE ID | INSIDE-COMPANY TRANSMISSION MESSAGE ID |
|---|---|---|---|---|
| 1311 | abc-eigyou | NO RESPONSE/BUSY | abc-eigyou_message-1 | abc-eigyou_message-2 |
| 1312 | abc-eigyou | TALKING ESTABLISHED (AFTER TALKING) | NO | NO |
| 1313 | abc-kaihatsu | CONNECTION TO ANSWERING MACHINE (AFTER TALKING) | abc-eigyou_message-1 | abc-eigyou_message-2 |
| | abc-kaihatsu | NO RESPONSE/BUSY | abc-kaihatsu_message-1 | abc-kaihatsu_message-2 |
| | abc-kaihatsu | TALKING ESTABLISHED (AFTER TALKING) | NO | NO |
| | abc-kaihatsu | CONNECTION TO ANSWERING MACHINE (AFTER TALKING) | abc-kaihatsu_message-1 | abc-kaihatsu_message-2 |
| | ... | ... | ... | ... |

| | COMPANY ID | MESSAGE TRANSMISSION CONDITION | OUTSIDE-COMPANY TRANSMISSION MESSAGE ID | INSIDE-COMPANY TRANSMISSION MESSAGE ID |
|---|---|---|---|---|
| 1321 | abc | NO RESPONSE/BUSY | abc_message-1 | NO |
| 1322 | abc | TALKING ESTABLISHED (AFTER TALKING) | NO | NO |
| 1323 | abc | CONNECTION TO ANSWERING MACHINE (AFTER TALKING) | abc_message-1 | NO |
| | def | NO RESPONSE/BUSY | def_message-1 | NO |
| | def | TALKING ESTABLISHED (AFTER TALKING) | NO | NO |
| | def | CONNECTION TO ANSWERING MACHINE (AFTER TALKING) | def_message-1 | NO |
| | ... | ... | ... | ... |

INFORMATION PROCESSING SYSTEM, MESSAGE SERVER, AND CONTROL METHOD AND CONTROL PROGRAM THEREOF

This application is a National Stage Entry of PCT/JP2011/004928 filed Sep. 2, 2011, which claims priority from Japanese Patent Application 2010-223323 filed Sep. 30, 2010, the contents of all of which are incorporated herein by reference, in their entirety.

TECHNICAL FIELD

The present invention relates to a technique for transmitting a message to a called terminal.

BACKGROUND ART

Patent Document 1 discloses a technique in which, when a called terminal is in a state of being incapable of responding, a message registered in a message registration area of a memory of a calling terminal is selected according to a state of the called terminal and is transmitted to the called terminal.

RELATED DOCUMENT

Patent Document

[Patent Document 1] Japanese Patent Application Publication No. 2002-051378

DISCLOSURE OF THE INVENTION

However, in the technique in the related art, messages transmitted to a called terminal, transmission timing of the messages and the like are all managed inside a calling terminal.

Therefore, transmission of messages to the called terminal cannot be controlled based on information which is not included in the calling terminal. As a result, flexible communications cannot be made between the calling terminal and the called terminal.

An object of the present invention is to provide a technique for solving the above-described problems.

In order to achieve the above-described object, a system according to the present invention includes a calling terminal that makes a call; a called terminal that can receive the call from the calling terminal; and a message server that stores in advance a plurality of messages correlated with call results to the called terminal from the calling terminal, selects a first message from the plurality of messages on the basis of the call results, and transmits the first message to the called terminal.

In order to achieve the above-described object, an apparatus according to the present invention is a message server connected to a calling terminal making a call and to a called terminal being able to receive a call from the calling terminal, wherein the message server stores in advance a plurality of messages correlated with call results to the called terminal from the calling terminal, selects a first message from the plurality of messages on the basis of the call results, and transmits the first message to the called terminal.

In order to achieve the above-described object, a method according to the present invention is a method of controlling a message server connected to a calling terminal making a call and to a called terminal being able to receive a call from the calling terminal, the method including a step of selecting a first message from a plurality of messages which are stored in advance so as to be correlated with call results to the called terminal from the calling terminal on the basis of the call results; and a step of transmitting the selected first message to the called terminal.

In order to achieve the above-described object, a program according to the present invention is a program for controlling a message server connected to a calling terminal making a call and to a called terminal being able to receive a call from the calling terminal, the program causing a computer to execute a step of selecting a first message from a plurality of messages which are stored in advance so as to be correlated with call results to the called terminal from the calling terminal on the basis of the call results; and a step of transmitting the selected first message to the called terminal.

According to the present invention, it is possible to transmit a message, which corresponds to a call result from a calling terminal to a called terminal, to the called terminal by using a message server, and thus it is possible to realize flexible communications.

BRIEF DESCRIPTION OF THE DRAWINGS

The above-described object, and other objects, features and advantages will become more apparent from the preferable embodiments described below and the following accompanying drawings.

FIG. 5 is a diagram illustrating content of messages stored in the message server according to the second embodiment of the present invention.

FIG. 6 is a diagram illustrating content of a user database according to the second embodiment of the present invention.

FIG. 7 is a diagram illustrating a message selection table stored in the message server according to the second embodiment of the present invention.

FIG. 13A is a diagram illustrating content of messages stored in the message server according to the third embodiment of the present invention.

FIG. 13B is a diagram illustrating a message selection table stored in the message server according to the third embodiment of the present invention.

FIG. 13C is a diagram illustrating a message selection table stored in the message server according to the third embodiment of the present invention.

DESCRIPTION OF EMBODIMENTS

Hereinafter, the embodiments of the present invention will be described in detail in an exemplified manner with reference to the drawings. However, configurations, dimensions, flows of processes, functional elements, and the like described in the following embodiments are only an example, modifications or alterations thereof are free, and thus are not intended to limit the technical scope of the present invention to the following description.

(First Embodiment)

Figure 1:
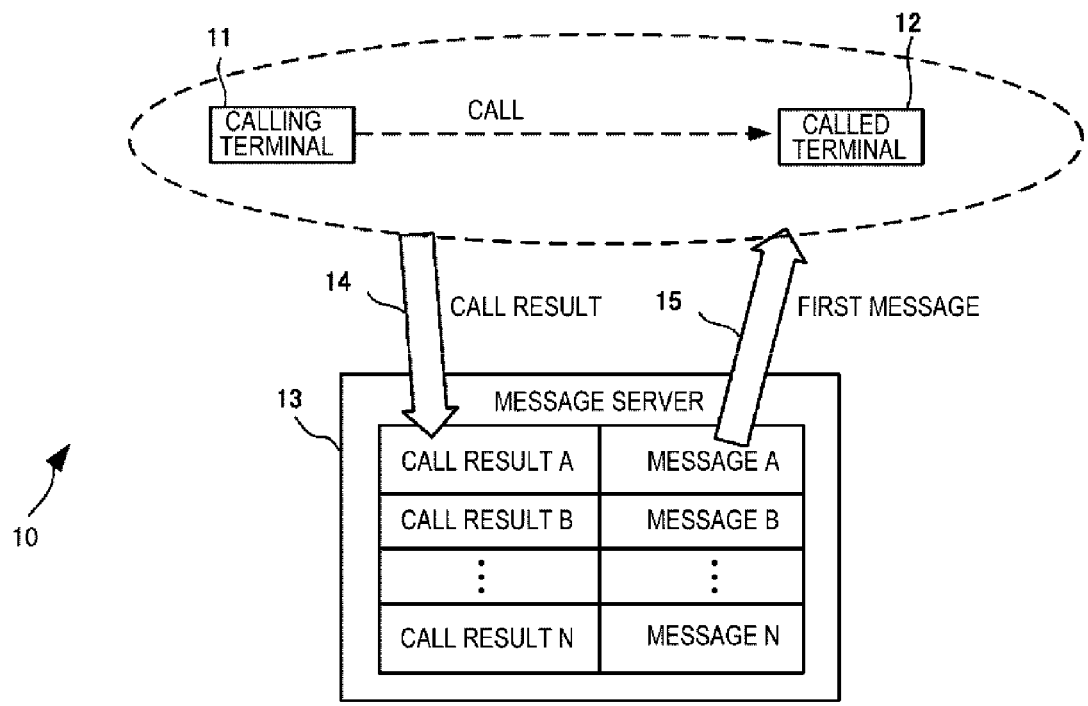
FIG. 1 is a block diagram illustrating a configuration of an information processing system according to a first embodiment of the present invention.

FIG. 1 is a block diagram illustrating a configuration of an information processing system 10 according to the first embodiment of the present invention. The information processing system 10 according to the present embodiment includes a calling terminal 11 making a call, a called terminal 12 which can receive a call from the calling terminal 11, and a message server 13.

A plurality of messages correlated with a call result from the calling terminal 11 to the called terminal 12 are stored in the message server 13 in advance. The message server 13 selects a first message 15 from a plurality of messages on the basis of a call result 14, and transmits it to the called terminal 12.

With the above-described configuration, according to the present embodiment, a caller registers a caller-created message corresponding to a call result in the message server 13 in advance, and thereby it is possible to transmit the message to a called terminal. As a result, it is possible to realize flexible communications.

(Second Embodiment)

Figure 2:
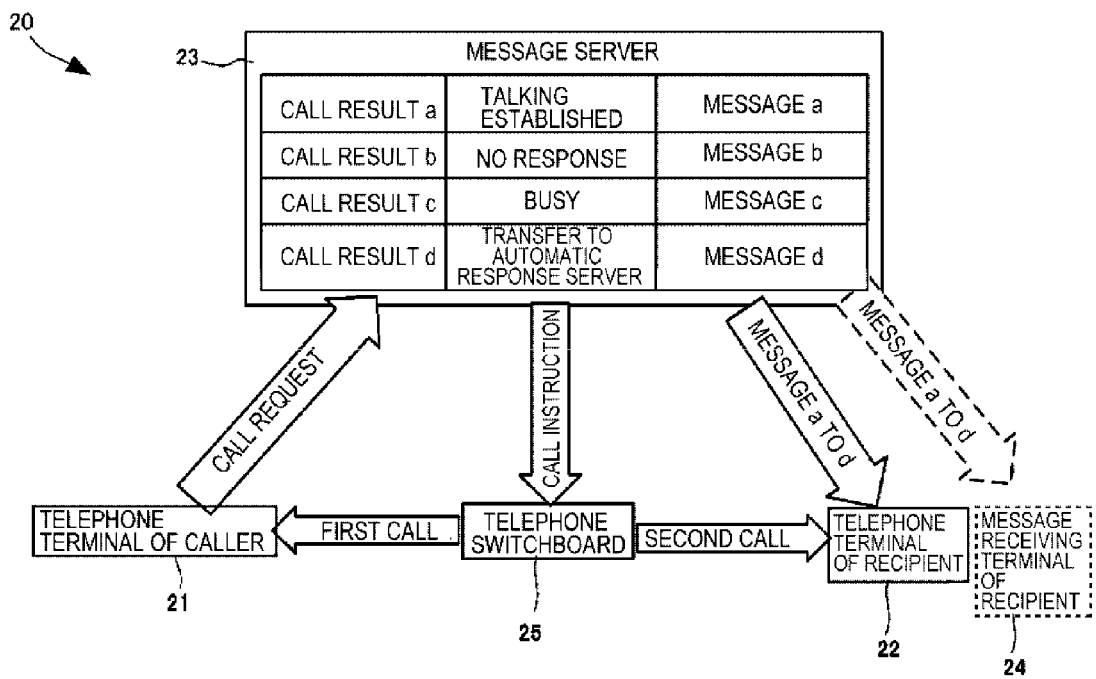
FIG. 2 is a block diagram illustrating a configuration of an information processing system according to a second embodiment of the present invention.

FIG. 2 is a block diagram illustrating a configuration of an information processing system 20 according to the second embodiment of the present invention. The information processing system 20 according to the present embodiment includes a telephone terminal 21 (hereinafter, referred to as a calling terminal) that a caller uses to make a call, and a telephone terminal 22 (hereinafter, referred to as a called terminal) that a recipient uses to receive the call. In addition, the information processing system 20 includes a message server 23 which receives a call request from the calling terminal 21 and makes a call to the called terminal 22. Further, the information processing system 20 may include a message receiving terminal 24 used for a recipient to receive a message.

The message server 23 makes a call to the called terminal 22 which can receive the call on the basis of a call request from the calling terminal 21, and transmits any one of messages a to d, which are correlated with a call result to the called terminal 22, to the called terminal 22 or the message receiving terminal 24.

Here, the message server transmits to the called terminal the message a when a call result shows that talking is established, the message b when a call result shows that there is no response and that the terminal is busy, the message c when a call result shows that the terminal is busy, and the message d when a call result shows that transmission to a predefined automatic response server is performed.

For example, when the called terminal 22 makes no response and is busy, the message server 23 transmits the message b corresponding to the call result b to the called terminal 22 or the message receiving terminal 24. The message transmitted to the message receiving terminal 24 is transmitted to a mail address 410 of FIG. 4, or is transmitted to a telephone number 409 as a short message.

Figure 3:
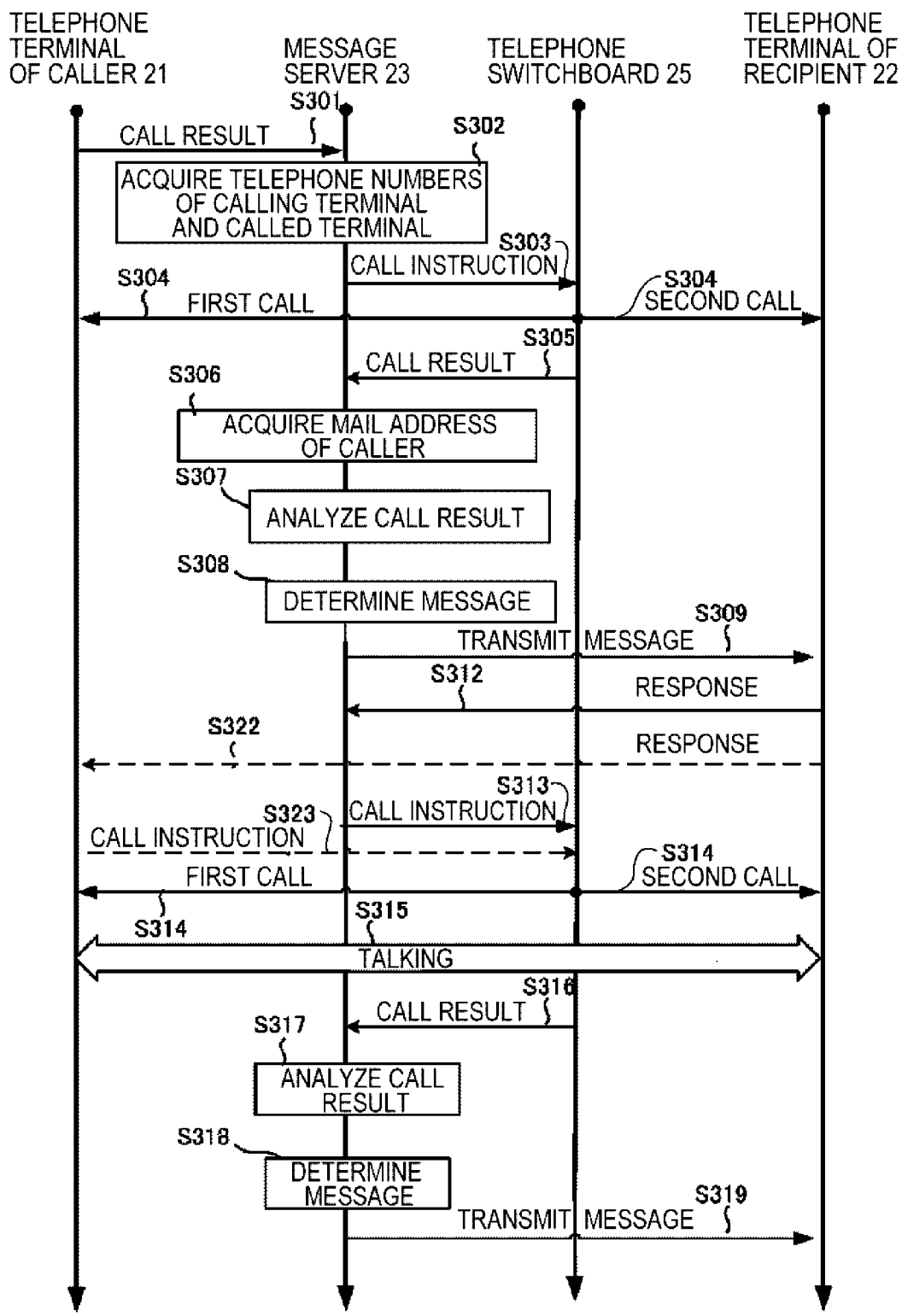
FIG. 3 is a sequence diagram of the information processing system according to the second embodiment of the present invention.

FIG. 3 is a sequence diagram illustrating an interchange performed between the calling terminal 21, the called terminal 22, the message server 23, and a telephone switchboard 25. The example of FIG. 3 shows a sequence of a case where talking to the called terminal 22 is not established (due to no response or the like) when a first call request from the calling terminal 21 is made, the calling terminal transmits a message to the called terminal 22 (or the message receiving terminal 24 of FIG. 2), and the message server automatically makes a re-call request when it receives a response to the message from the called terminal.

The calling terminal 21 requests the message server 23 to make a call in step S301. In step S302, the message server 23 acquires telephone numbers of the calling terminal 21 and the called terminal 22 on the basis of the call request.

In step S303, the message server 23 transmits a call instruction to the telephone switchboard 25. In step S304, the telephone switchboard 25 makes a call to the calling terminal 21 and the called terminal 22, and, in step S305, the telephone switchboard 25 transmits a call result to the message server 23.

In step S306, the message server 23 acquires a mail address of a user of the called terminal 22 stored in a database of the message server in response to the call request from the calling terminal 21. The message server 23 analyzes the call result in step S307, determines any one of the messages a to d corresponding to the call result in step S308, and transmits the determined message to the called terminal 22 in step S309.

The called terminal 22 transmits a response to the message transmitted from the message server 23 in step S312, and the message server 23 transmits a call instruction to the telephone switchboard 25 in relation to the response in step S313. In step S314, the telephone switchboard 25 makes a call to both the calling terminal 21 and the called terminal 22. A talking is established based on this call when the calling terminal 21 and the called terminal 22 respond to the call. In addition, as shown in step S322, a response from the called terminal 22 may be transmitted not to the message server 23 but to the calling terminal 21, and a sequence of requesting to the telephone switchboard 25 (step S323) may be performed using a re-call request from the calling terminal 21 as a trigger.

In addition, in step S316, the telephone switchboard 25 transmits the call result to the message server 23. In step S317, the message server 23 analyzes the call result. In addition, the message server 23 determines a message to be transmitted to the called terminal 22 in step S318, and transmits the message to the called terminal 22 in step S319.

Figure 4:
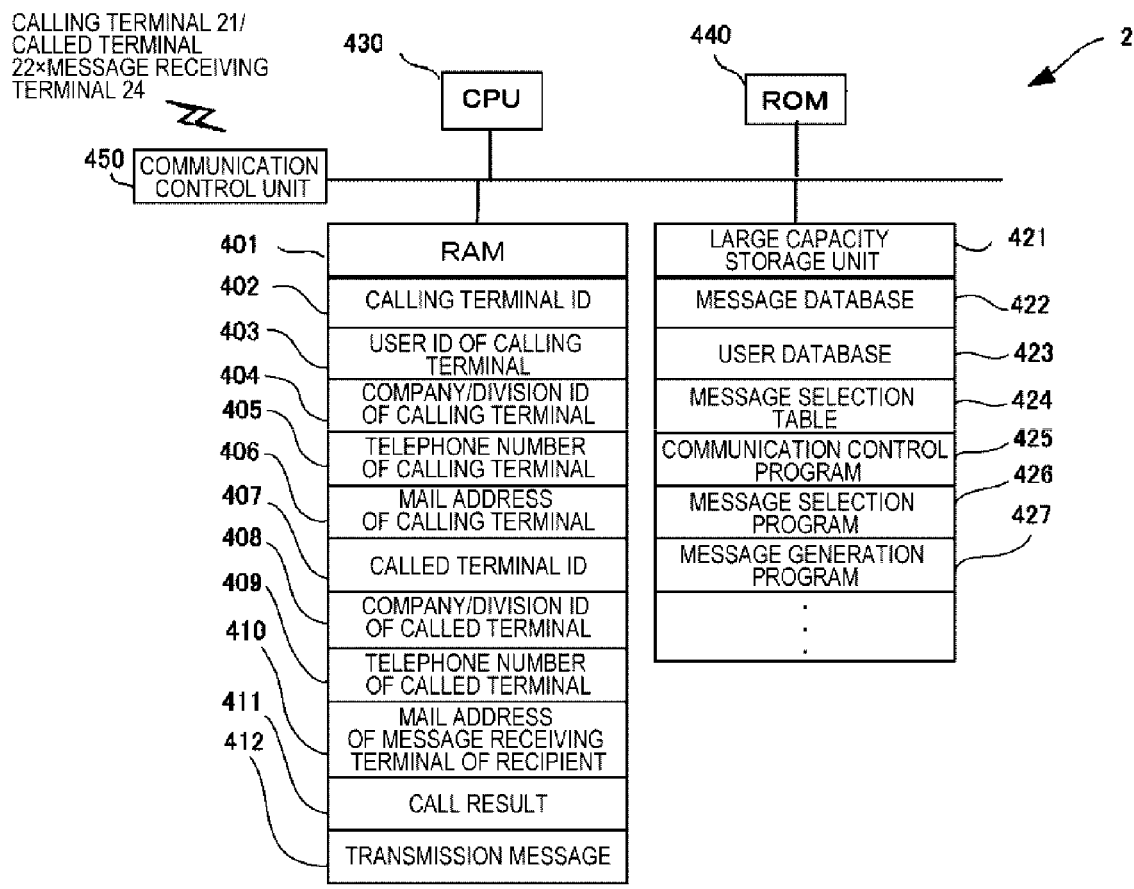
FIG. 4 is a block diagram illustrating a hardware configuration of a message server according to the second embodiment of the present invention.

FIG. 4 is a block diagram illustrating a hardware configuration of the message server 23 according to the present embodiment. A Central Processing Unit (CPU) 430 is a processor for processing operations, and a Read Only Memory (ROM) 440 stores fixed data and programs. A communication control unit 450 controls communication among the message server 23, the calling terminal 21, the called terminal 22, and the message receiving terminal 24.

A Random Access Memory (RAM) 401 provides a work area of the CPU 430. The RAM 401 stores a calling terminal ID 402, a user ID 403 of the calling terminal, company/division ID 404 of the calling terminal, a telephone number 405 of the calling terminal, and a mail address 406 of the calling terminal. In addition, the RAM 401 stores a called terminal ID 407 of the calling terminal, a company/division ID 408 of the calling terminal, a telephone number 409 of the calling terminal, and a mail address 410 of the message receiving terminal of a recipient, and also stores a call result 411 and a transmission message 412.

The calling terminal ID 402 stored in the RAM 401 is an ID given to each calling terminal. The calling terminal ID 402 associates the user ID 403 given to a caller, the company/division ID 404 regarding each caller stored in this user ID 403, the telephone number 405 given to each calling terminal, and the mail address 406 of the calling terminal.

In addition, the called terminal ID 407 also associates the company/division ID 408 correlated with a recipient, the telephone number 409 given to each called terminal, and the mail address 410 of the recipient.

A large capacity storage unit 421 stores a message database 422, a user database 423, a message selection table 424, a communication control program 425, a message selection program 426, and a message generation program 427.

FIG. 5 is a diagram illustrating content of the message database 422 according to the present embodiment.

The message server 23 selects the message ID "t-suzuki_message-1" "j-yamada_message-1" in a case where a call result shows that there is no response and the terminal is busy, and a re-call from the calling terminal is instructed with the name of a caller.

The message server 23 selects the message ID "t-suzuki_message-2", "t-suzuki_message-11", or "t-suzuki_message-12" in a case where a call result shows there is no response and the terminal is busy, and waiting for a return call from a recipient is instructed with the name of a caller.

In addition, the message server 23 selects "t-suzuki_message3" or "t-suzuki_message13" in a case where talking is established and a message of gratitude is sent with the name of a caller.

Further, the message server selects the message ID "j-yamada_message-1" in a case where a calling result shows that there is no response, the terminal is busy, or a connection to an answering machine is made. The message 501 is URL for activating a transmission application which transmits to a calling terminal a message indicating that a called terminal has become in a state of being capable of responding to a calling terminal.

FIG. 6 is a diagram illustrating information stored in the user database 423. The reference numeral 601 is information regarding a user ID "i-suzuki", and the reference numeral 602 is information regarding to a user ID "j-yamada".

The reference numeral 601 is information of a company ID "abc", a division ID "abc-eigyou", the family name "suzuki", the first name "Taro", a mobile address "t-szk@xxx.ne.jp", a PC address "t-szk@nec.com", an external telephone number "09012345678", and an extension number "81112222", all of which are associated with the user ID "t-suzuki". The reference numeral 602 is information of a company ID, a division ID, the family name, the first name, a mobile address, a PC address, an external telephone number, and an extension number, all of which are associated with the user ID.

In a case where a call result shows that there is no response and the terminal is busy, the message server 23 acquires user information of the calling terminal 21 from the user database 423 when the message server 23 transmits a message to the called terminal 22.

FIG. 7 is a diagram illustrating the message selection table 424 stored in the message server 23 according to the present embodiment. As indicated by the reference numeral 701, in a case where a caller "t-suzuki" makes a call and a call result shows "no response or busy", a transmission message ID "t-suzuki_message-1" is selected as an inside-company message, and a transmission message ID "t-suzuki_message-2" is selected as an outside-company message.

On the other hand, as indicated by the reference numeral 702, in a case where a caller "t-suzuki" makes a call and a call result shows "talking established", a transmission message ID "t-suzuki_message-3" is selected as an outside-company message and is transmitted. In addition, in the present embodiment, an inside-company message is not prepared in this case, but, in this case, the message server 23 selects "abc-eigyou_message-2" and "abc-kaihatsu_message-2" as messages with the name of a division to which a caller belongs in the reference numeral 1301 of FIG. 13A, so as to be transmitted to a recipient. Further, as indicated by the reference numeral 703, in a case where a caller "t-suzuki" makes a call and a call result shows "connecting answering machine", a transmission message ID "t-suzuki_message-1" is selected as an inside-company message, and a transmission message ID "t-suzuki_message-2" is selected as an outside-company message. As indicated by the reference numerals 701 to 703, the message server 23 stores a plurality of messages corresponding to call results in relation to a calling terminal used by a caller of the user ID "t-suzuki".

Figure 8:
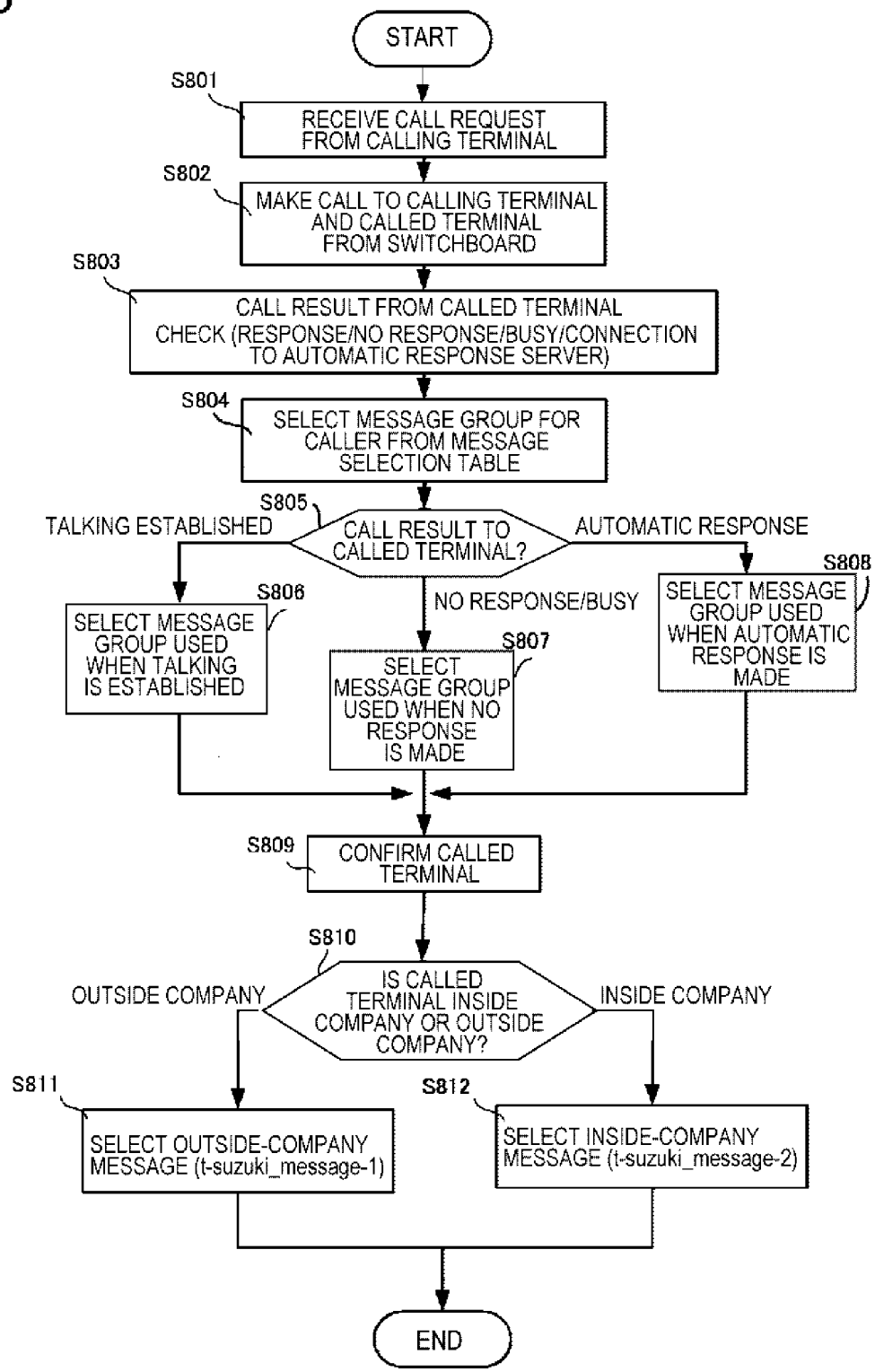
FIG. 8 is a flowchart illustrating a flow of processes in the message server according to the second embodiment of the present invention.

FIG. 8 is a flowchart illustrating a flow of processes in the message server 23 according to the present embodiment. In step S801, the message server 23 receives a call request from a calling terminal using the communication control unit 450, and determines telephone numbers of the calling terminal and a called terminal using the calling terminal ID 402 and the called terminal ID 407 stored in the RAM 401. In addition, in step S802, a call is made to the calling terminal and the called terminal through the telephone numbers thereof by using the telephone switchboard 25.

The message server 23 checks a call result in step S803. In addition, in step S804, the message selection program 426 selects a transmission message group indicated by the reference numerals 701 to 703 of FIG. 7, which are messages for a calling terminal, from the message selection table 424. The message server 23 checks a call result in step S805. Further, when talking is established, in step S806, the message selection program 426 selects a message group which is used in a case that talking is established. When connection to an automatic response message is made, in step S808, the message selection program 426 selects message group which is used in a case an automatic response is made. Meanwhile, when there is no response and the terminal is busy, in step S807, the message selection program 426 selects a message group which is used in a case there is no response.

The message server 23 confirms the called terminal in step S809, and checks a classification of whether an attribute of the called terminal is set to either inside-company or outside-company in step S810. If the attribute of the called terminal is set to outside-company, in step S811, the message selection program 426 selects the outside-company message "t-suzuki_message-1" indicated by the reference numeral 701 of FIG. 7, that is, "t-suzuki_message-1" among the messages 501 of FIG. 5. If the attribute of the called terminal is set to inside-company, in step S812, the message selection program 426 selects the inside-company message "t-suzuki_message-2" indicated by the reference numeral 701 of FIG. 7, that is, "t-suzuki_message-2" among the messages 501 of FIG. 5.

Figure 9A:
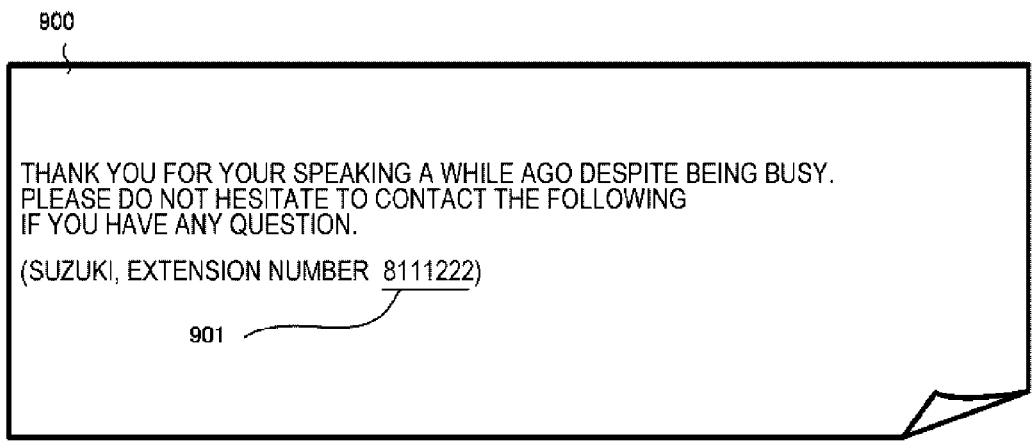
FIG. 9A is a diagram illustrating an example of a message transmitted from a message database according to the second embodiment of the present invention.

FIG. 9A is a diagram illustrating a message 900 stored in the message database 422. The message 900 is a message for notifying a called terminal of gratitude for that talking is established and of a personal extension number 901 of a caller.

Figure 9B:
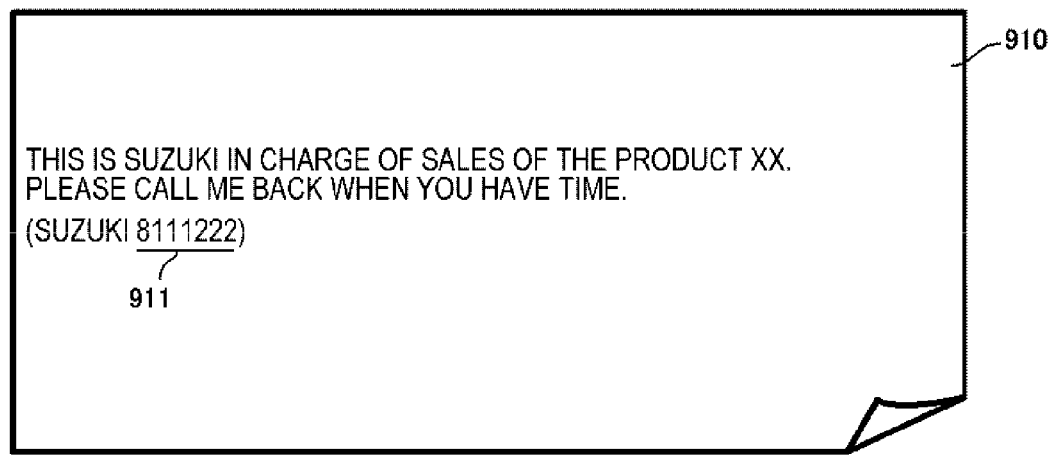
FIG. 9B is a diagram illustrating another example of a message transmitted from the message database according to the second embodiment of the present invention.

FIG. 9B is a diagram illustrating a message 910 stored in the message database 422 according to the present embodiment. The message 910 is a message for notifying a called terminal of a personal extension number 911 of a caller and requesting a return call to the caller in a case that a call result shows no response or busy.

Figure 10A:
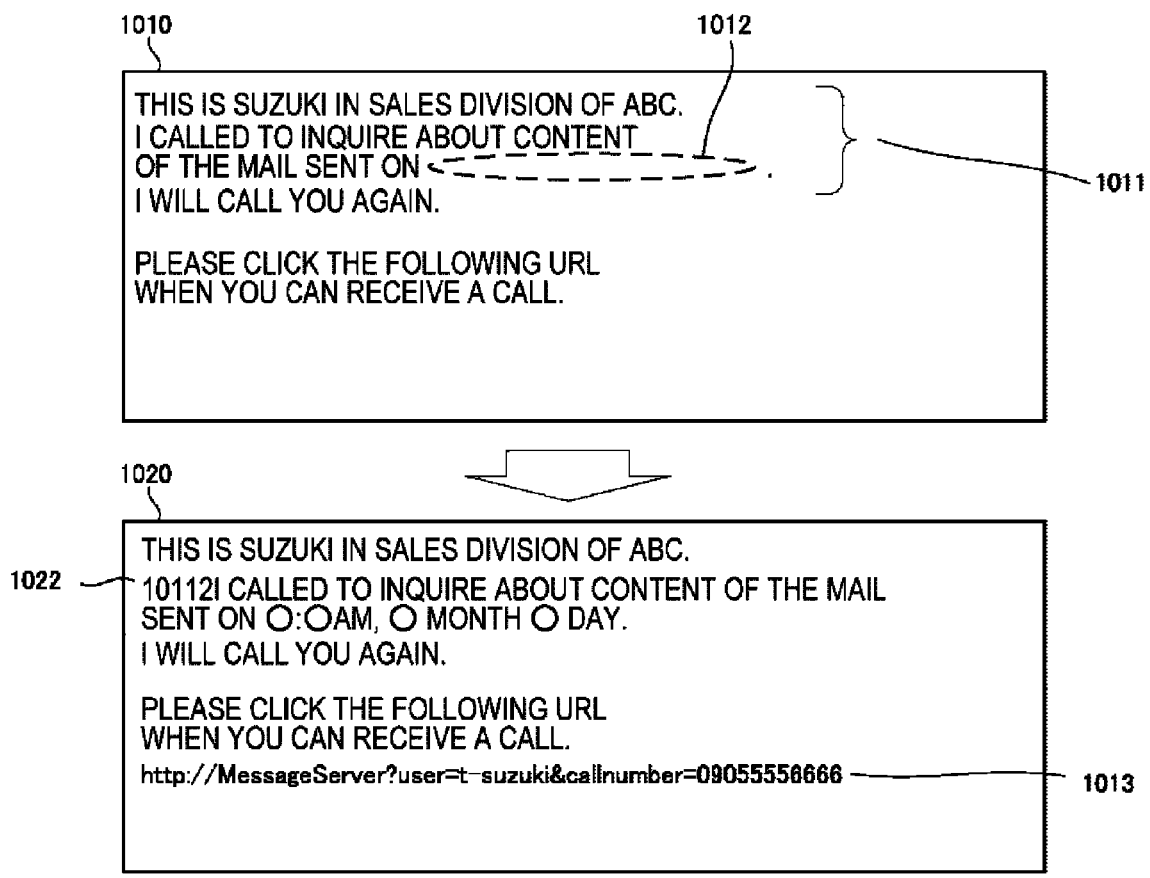
FIG. 10A is a diagram illustrating an example of a message stored in the message server according to the second embodiment of the present invention.
Figure 10B:
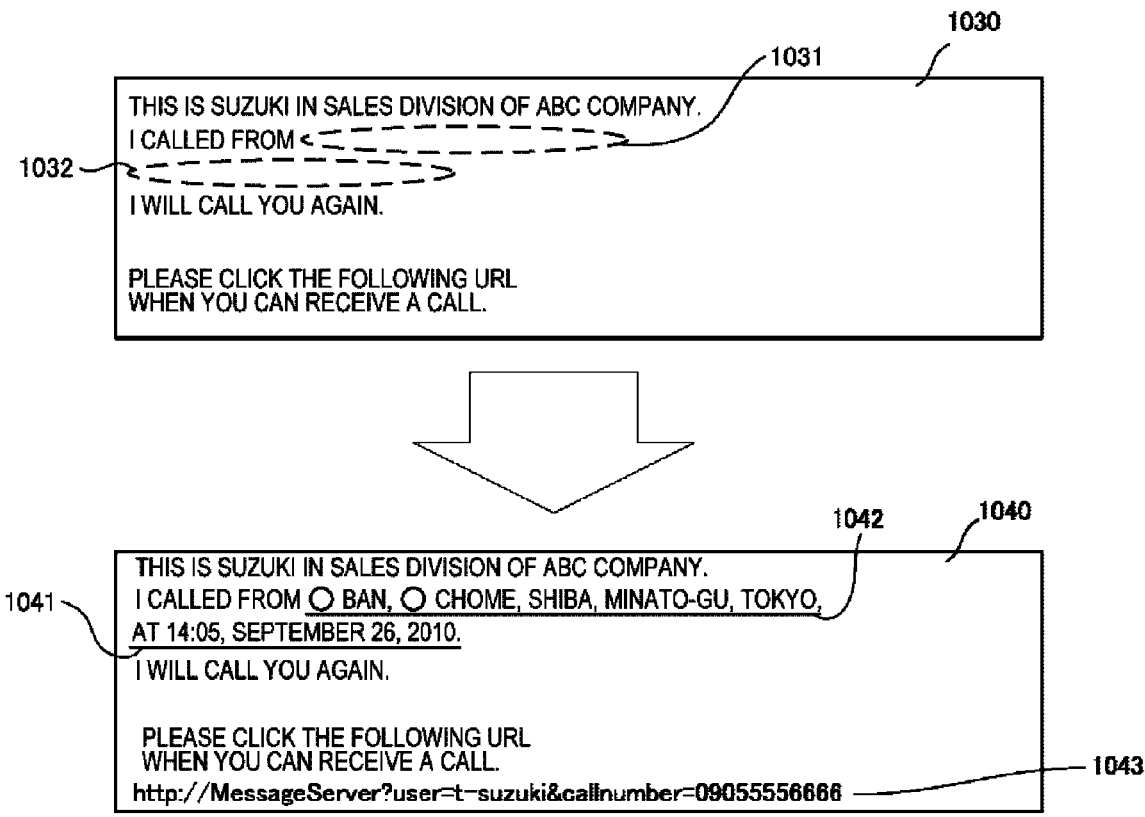
FIG. 10B is a diagram illustrating another example of a message stored in the message server according to the second embodiment of the present invention.

FIGS. 10A and 10B are diagrams illustrating messages 1020 and 1040 for explaining circumstances of a calling terminal when the calling terminal makes a call to a called terminal. The message database 422 stores messages 1010 and 1030 shown in these figures, and the message generation program 427 generates the messages 1020 and 1040 on the basis of circumstances of the calling terminal.

In FIG. 10A, the message 1010 includes a message 1011 indicating circumstances of a caller in which the caller received a mail from a recipient and called to inquire. The message 1010 stored in the message database 422 includes a blank 1012. The message generation program 427 performs a process of filling the time point at which the caller received the mail from the recipient in the blank 1012, thereby generating the message 1020. The URL 1013 is a URL for activating an application which transmits to the calling terminal a message for notifying the calling terminal of that the called terminal has become able to respond. As such, the URL 1013 is filled in the message, and thereby the recipient can promptly respond to the caller that the recipient enters a state of being capable of receiving a call.

In FIG. 10B, the message 1030 stored in the message database 422 includes blanks 1031 and 1032. The message generation program 427 performs a process of filling time information 1041 which indicates the time point at which a caller made a call and location information 1042 which indicates the place at which the call was made in the blanks 1031 and 1032 respectively, thereby generating the message 1040. In the same manner as FIG. 10A, the URL 1043 is a URL for activating an application which transmits to the calling terminal a message for notifying of that the called terminal has become in a state of being capable of responding, to the calling terminal. As such, the URL 1043 is filled in the message, and thereby the recipient can promptly respond to the caller that the recipient enters a state of being capable of receiving a call.

Figure 10C:
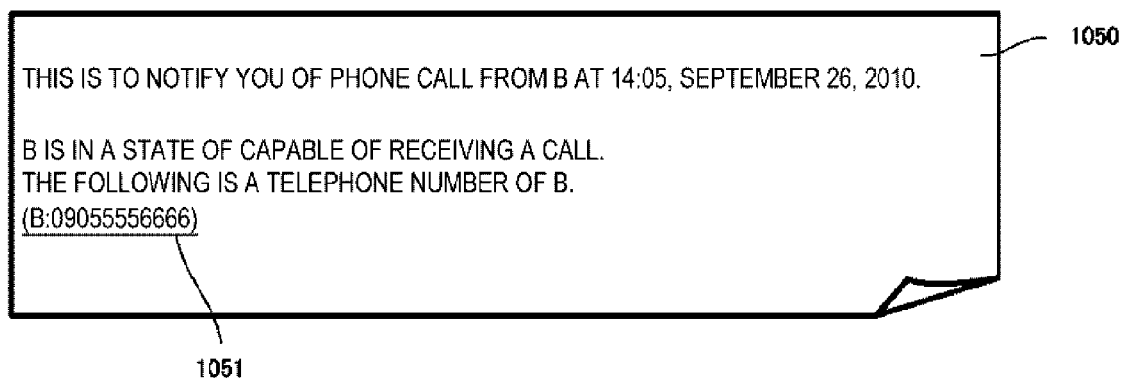
FIG. 10C is a diagram illustrating another example of a message stored in the message server according to the second embodiment of the present invention.

FIG. 10C shows a message 1050, which is generated when the recipient receives the message 1020 or the message 1040 of FIG. 10A or 10B and clicks the URL 1013 or the URL 1043, and is automatically transmitted to the calling terminal. This message 1050 notifies the caller of that the recipient has become in a state of capable of responding, and thus has a telephone number 1051 of the recipient filled therein. In other words, the message generation program 427 calls information regarding a call time and the recipient in response to the clicking of the URL 1013 or the URL 1043, thereby generating the message 1050.

Figure 11:
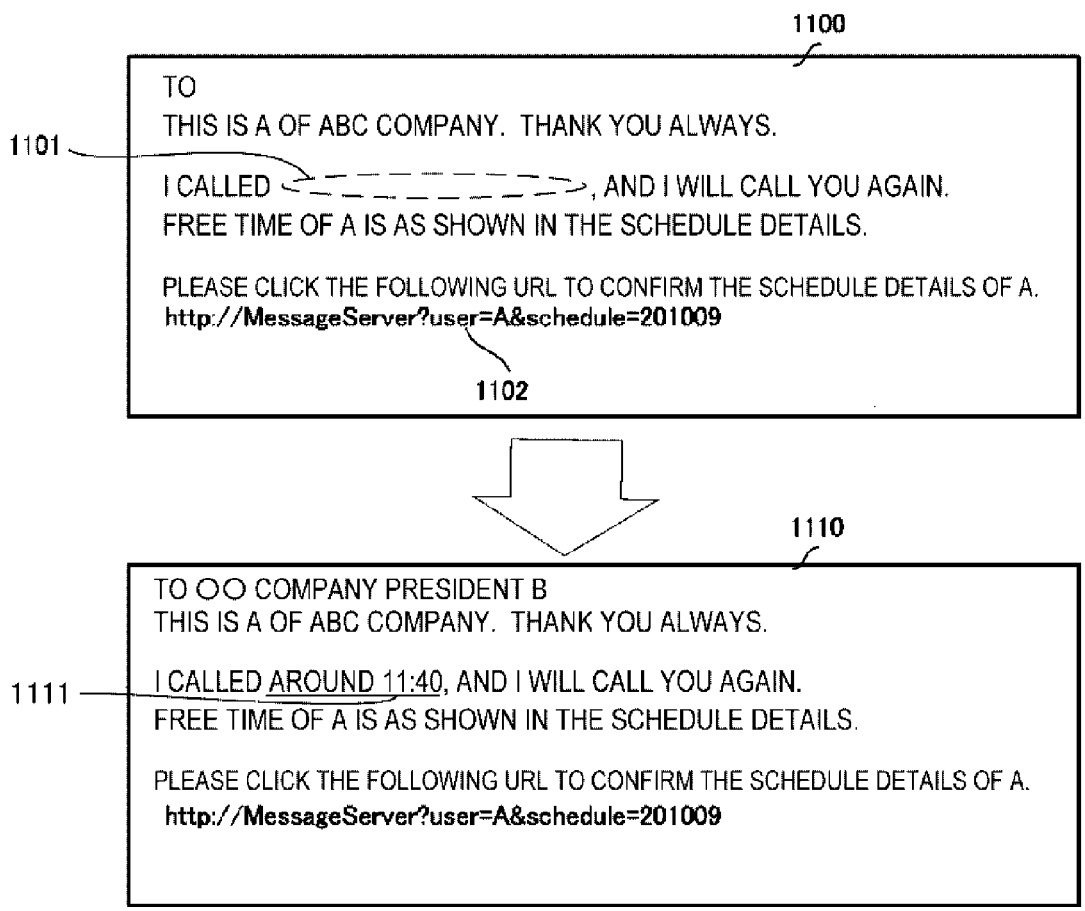
FIG. 11 is a diagram illustrating an example of a message stored in the message server according to the second embodiment of the present invention.

FIG. 11 is a diagram illustrating a message for transmitting the time point at which a calling terminal made a call and schedule information of a caller. In FIG. 11, a message 1100 includes a blank 1101 in which a message indicating a time point at which the calling terminal made a call is described. The message generation program 427 performs a process of filling the time point 1111 in which the calling terminal made a call in the blank 1101, thereby generating the message 1110.

According to the present embodiment, with the above-described configuration, a caller registers caller-created messages corresponding to call results in the message selection table 424 in the message server 23 in advance, and thereby it is possible to transmit the message to a called terminal and to therefore realize flexible communication. Thereby, it is possible to transmit a wide variety of messages corresponding to states of a calling terminal and a called terminal, whereas, only messages registered in a message registration area of a memory of a calling terminal can be selected and be transmitted in the related art.

(Third Embodiment)

Figure 12:
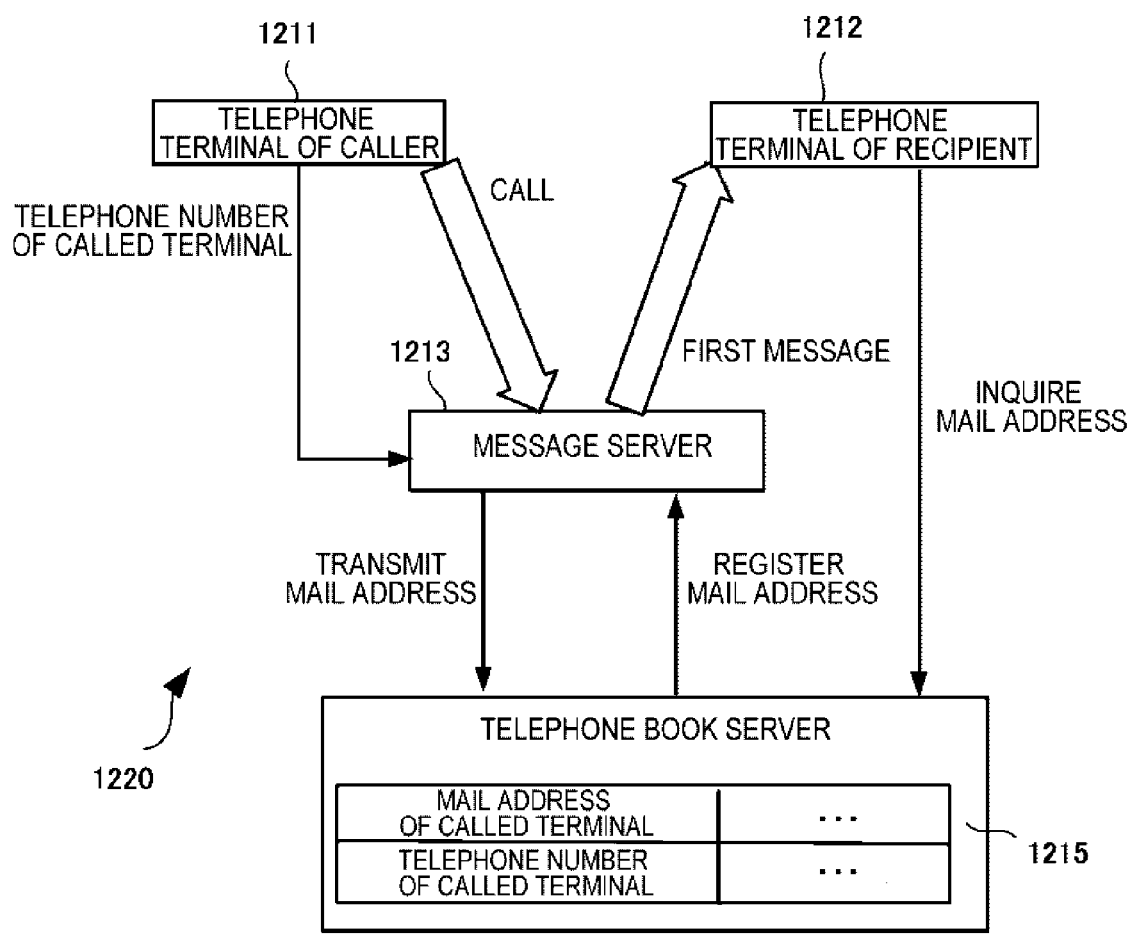
FIG. 12 is a block diagram illustrating a configuration of an information processing system according to a third embodiment of the present invention.

FIG. 12 is a block diagram illustrating an information processing system 1220 according to the third embodiment. The information processing system 1220 shown in FIG. 12 is different from the block diagram shown in FIG. 2 in that it includes a telephone book server 1215, and the other configurations thereof are the same as the configurations of the block diagram shown in FIG. 2.

A message server 1213 acquires a telephone number of a called terminal 1212 in response to a call request from a calling terminal 1211, and inquires of the telephone book server 1215 a mail address corresponding to the acquired telephone number. The telephone book server 1215 transmits a mail address correlated with the telephone number of the called terminal 1212 to the message server 1213 as a reply to the message server 1213. As a reaction to the transmitted mail address, The message server 1213 transmits a message correlated with the calling terminal 1211 to the called terminal 1212 according to a call result. The telephone book server 1215 may register a mail address of a recipient on the basis of a registration instruction from the calling terminal 1211 or the called terminal 1212.

With the above-described configuration and operation, even in a case where a mail address correlated with a called terminal is not registered in the message server in advance, the message server can acquires the mail address correlated with the called terminal by inquiring it of the telephone book server. Thereby, the message server can transmit a message from a calling terminal to a called terminal.

(Fourth Embodiment)

An information processing system according to the fourth embodiment of the present invention will be described with reference to FIGS. 13A, 13B, 13C and 14. In the second embodiment, in a case where messages are registered in the message server with the personal name of a caller in advance, the calling terminal differentiates the messages to be transmitted depending on whether the called terminal is an inside company or outside company terminal. However, in the present embodiment, in a case where messages are not registered in the message server with the personal name of a caller, it is further determined whether a called terminal is a terminal to be handled with a company name, a terminal to be handled with a division name, or a terminal to be handled with a personal name. A message is transmitted with a division name to which a caller belongs or with a company name to which the caller belongs, depending on each case. The other configurations and operations are the same as those of the second embodiment, the same constituent elements are given the same reference numerals, and description thereof will not be repeated.

FIG. 13A is a diagram illustrating the message selection table 424 according to the present embodiment. In a case where a call result shows no response or busy, and it is notified with a division name to which a caller belongs that a re-call will be made from a calling terminal, the message server selects "abc-eigyou_message-1" among messages 1301, that is, an outside-company message or an inside-company message indicated by the reference numeral 1311 of FIG. 13B. Or the message server selects "abc-kaihatsu_message-1" among the messages 1301 of FIG. 13A. Further, in a case where a call result shows that a connection to an answering machine is made, the message server selects a message 1301, which is like the message in a case where a call result shows no response or busy, that is, an outside-company message or an inside-company message indicated by the reference numeral 1313 of FIG. 13B.

In a case where a call result shows no response or busy, and it is notified with a division name to which a caller belongs that a caller waits for a return call from a recipient, the message server selects "abc-eigyou_message-2" among messages 1301, that is, the outside-company message or the inside-company message indicated by the reference numeral 1311 of FIG. 13B. Or the message server selects "abc-kaihatsu_message-2" among the messages 1301 of FIG. 13A.

In a case where a call result shows no response, busy, or that connection to an answering machine is made, and it is notified with a company name to which a caller belongs to that a re-call will be made from a calling terminal, the message server selects "abc-eigyou_message-1" among messages 1302, that is, an outside-company message indicated by the reference numeral 1321 or 1323 of FIG. 13C. Or the message server selects "def_message-1" among the messages 1302 of FIG. 13A.

On the other hand, in a case where a call result shows "talking established", in the present embodiment, the message server does not transmit any of an outside-company message and an inside-company message in this condition. In addition, even in a case where a call result to a called terminal belonging to the inside-company shows no response, busy, or that connection to an answering machine is made, in the present embodiment, the message server does not transmit an inside-company message in this condition.

Figure 14:
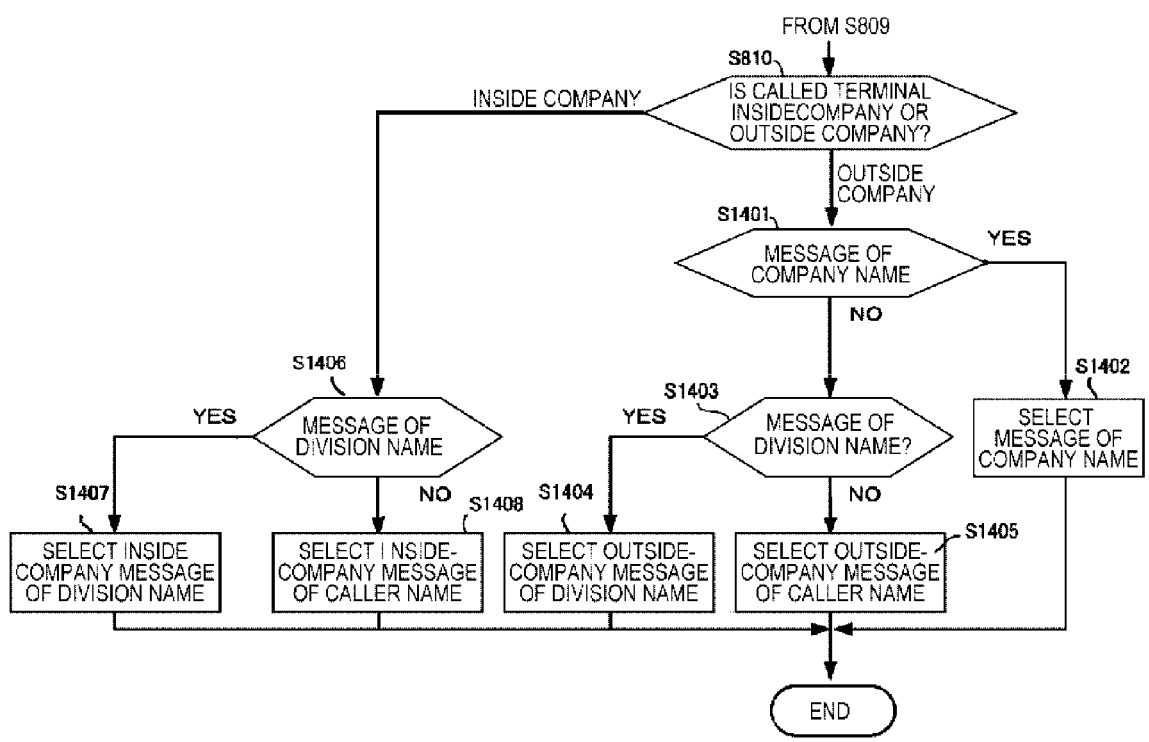
FIG. 14 is a flowchart illustrating a flow of processes in a message server according to a fourth embodiment of the present invention.

FIG. 14 is a flowchart illustrating a flow of processes in the message server according to the present embodiment. Steps S809 and S810 shown in FIG. 14 are the same as steps S809 and S810 shown in FIG. 8.

The message server 23 checks whether an attribute of the called terminal is set to either inside-company or outside-company in step S810. If the attribute of the called terminal is set to outside-company, the message selection program 426 checks whether or not a message with the company name is transmitted in step S1401. If the message with the company name is transmitted, the message selection program 426 selects a message with the company name in step S1402. In other words, the outside-company message "abc_message-1" indicated by the reference numeral 1321 or 1323 of FIG. 13B, that is, "abc_message-1" is selected among the messages 503 of FIG. 5.

In addition, if the attribute of the called terminal is set to outside-company, and a message with the company name is not transmitted, the message selection program 426 checks whether or not a message with the division name is transmitted in step S1403. If the message with the division name is transmitted, the message selection program 426 selects a message with the division name in step S1404. In other words, the outside-company message "abc-eigyou_message-1" indicated by the reference numeral 1311 or 1313 of FIG. 13A, that is, "abc-eigyou_message-1" is selected among the messages 502 of FIG. 5.

On the other hand, if the attribute of the called terminal is set to inside-company, the message selection program 426 checks whether or not a message with the division name is transmitted in step S1406. If the message with the division name is transmitted, the message selection program 426 selects a message with the division name in step S1407. In other words, the inside-company message "abc_message-2" indicated by the reference numeral 1311 or 1313 of FIG. 13A, that is, "abc_message-2" is selected among the messages 502 of FIG. 5.

In addition, in a case where an inside-company message with a caller name is transmitted in step S1405, the message selection program 426 selects "t-suzuki_message-2" indicated by the reference numeral 701 or 703 of FIG. 7. On the other hand, in a case where an outside-company message with a caller name is transmitted in step S1408, the message selection program 426 selects "t-suzuki_message-1" or "t-suzuki_message-3" indicated by the reference numerals 701 to 703 of FIG. 7.

According to the present embodiment, with the above-described configuration, messages with the division name or the company name can be registered in the message server 23 in advance according to an attribute of a called terminal. Thereby, it is possible to realize flexible communication from a calling terminal to a called terminal. Specifically, it is possible to transmit a message which is a message with a division name or a company name to which a user correlated with a caller belongs and which has content determined in detail according to an attribute of a called terminal and a call result.

(Fifth Embodiment)

An information processing system according to the fifth embodiment of the present invention will be described with reference to FIG. 15. In the second embodiment, messages to be transmitted are differentiated depending on whether the called terminal is an inside company or outside company terminal. However, in the present embodiment, it is further determined that a calling terminal is an extension telephone or a mobile phone, and respectively corresponding messages are transmitted. The other configurations and operations are the same as those of the second embodiment, the same constituent elements are given the same reference numerals, and description thereof will not be repeated.

Figure 15:
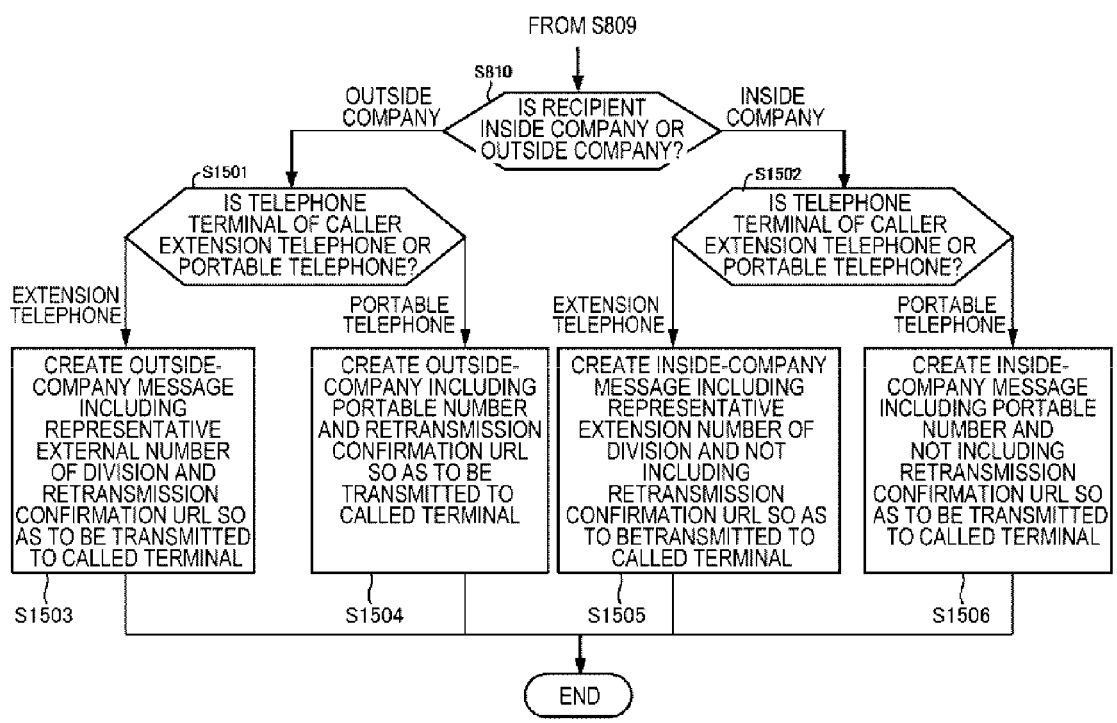
FIG. 15 is a flowchart illustrating a flow of processes in a message server according to a fifth embodiment of the present invention.

FIG. 15 is a flowchart illustrating a flow of processes in the message server according to the present embodiment. The processes in steps S801 to S810 of FIG. 8 are the same as those in the second embodiment. However, in the present embodiment, in step S810, it is determined whether a recipient is a person outside a company or a person inside the company on the basis of a telephone number of a called terminal, and the flow proceeds to step S1501 if the recipient is outside the company, and the flow proceeds to step S1502 if the recipient is inside the company.

In step S1501, it is determined whether or not the telephone terminal of the caller is an extension telephone or a mobile phone. Then, if the calling terminal is an extension telephone, the flow proceeds to step S1503 where an outside-company message, which includes a representative external number of the division and a retransmission confirmation URL, is created and transmitted to the called terminal. On the other hand, if the calling terminal is a mobile phone, the flow proceeds to step S1504 where an outside-company message, which includes a mobile phone number and a retransmission confirmation URL, is created and transmitted to the called terminal.

In step S1502, it is determined whether the telephone terminal of the caller is an extension telephone or a mobile phone. Then, if the calling terminal is an extension telephone, the flow proceeds to step S1505 where an inside-company message, which includes a representative extension number of the division and does not include a retransmission confirmation URL, is created and transmitted to the called terminal. On the other hand, if the calling terminal is a mobile phone, the flow proceeds to step S1506 where an inside-company message, which includes a mobile phone number and does not include a retransmission confirmation URL, is created and transmitted to the called terminal.

According to the present embodiment, with the above-described operation, it is possible to prepare for fine-grained messages corresponding to the kind of calling terminal or an attribute of a recipient as messages transmitted to a called terminal. Therefore, it is possible to display a flexible content as a message transmitted to a called terminal.

(Other Embodiments)

As above, although the embodiments of the present invention have been described in detail, a system or an apparatus configured by any combination of other features included in each embodiment is also included in the scope of the present invention.

The present invention may be applied to a system including a plurality of apparatuses, or may be applied to a single apparatus. In addition, the present invention may also be applied to a case where a control program for realizing the functions of the embodiments is supplied to a system or an apparatus directly or from a remote location. Therefore, in order to realize the functions of the present invention using a computer, a program installed in the computer, a medium storing the program therein, and a World Wide Web (WWW) server from which the program is downloaded are also included in the scope of the present invention.

This application claims priority to Japanese Patent Application No. 2010-223323, filed on Sep. 30, 2010, the entire contents all of which are incorporated herein by reference.

What is claimed is:

1. An information processing system comprising:
   a calling terminal that makes a call;
   a called terminal that can receive the call from the calling terminal; and
   a message server that stores in advance a plurality of messages correlated with call results which indicates a result of connecting a call from the calling terminal to the called terminal, acquires a call result, selects a first message from the plurality of messages on the basis of the acquired call result, and transmits the first message to the called terminal,
   wherein the call result correlated with the message which is stored in the message server indicates
   a case where the called terminal receives a call from the calling terminal, and talking is established.

2. The information processing system according to claim 1, wherein the plurality of messages are classified for each attribute of the called terminal, and the first message is selected according to the attribute of the called terminal.

3. The information processing system according to claim 1, wherein the first message includes a reply unit which realizes a return call to the calling terminal or transmission of a message to the calling terminal and the calling terminal.

4. The information processing system according to claim 1, wherein the reply unit is a telephone number of the calling terminal.

5. The information processing system according to claim 1, wherein the first message includes a request unit which requests the message server to transmit a second message indicating a state in which the called terminal can respond, to the calling terminal.

6. The information processing system according to claim 5, wherein the request unit is an URL for transmitting the second message to the calling terminal.

7. The information processing system according to claim 1, wherein the message server stores the plurality of messages so as to further correspond to circumstances of the calling terminal when the calling terminal makes a call to the called terminal, and selects the first message on the basis of the circumstances of the calling terminal.

8. The information processing system according to claim 7, wherein the circumstances of the calling terminal include at least one circumstance of:
   a position where the calling terminal makes a call; and
   a time point when the calling terminal makes a call.

9. The information processing system according to claim 1, wherein the first message includes schedule information of a user of the calling terminal or position information of the calling terminal.

10. The information processing system according to claim 1, further comprising:
    a telephone book server that stores a telephone number and a mail address of the called terminal so as to be correlated with each other,
    wherein the message server acquires the telephone number of the called terminal from the calling terminal, inquires of the telephone book server the mail address corresponding to the telephone number of the called terminal, and transmits the first message to the mail address which is replied from the telephone book server.

11. The information processing system according to claim 10, wherein the telephone book server includes a registration unit that registers a mail address of a user of the called terminal on the basis of a registration instruction from the calling terminal or the called terminal.

12. The information processing system according to claim 1, further comprising:
    a telephone switchboard that makes a call to both the calling terminal and the called terminal so as to establish talking between the calling terminal and the called terminal,
    wherein the message server receives a call request from the calling terminal, and instructs the telephone switchboard to make a first call to the calling terminal and to make a second call to the called terminal.

13. A message server which is connected to a calling terminal making a call and to a called terminal being able to receive a call from the calling terminal,
    wherein the message server stores in advance a plurality of messages correlated with call results which indicates a result of connecting a call from the calling terminal to the called terminal, acquires a call result, selects a first message from the plurality of messages on the basis of the acquired call result, and transmits the first message to the called terminal, and
    wherein the call result correlated with the message which is stored in the message server indicates
    a case where the called terminal receives a call from the calling terminal, and talking is established.

14. A method of controlling a message server connected to a calling terminal making a call and to a called terminal being able to receive a call from the calling terminal, comprising:
    acquiring a call result,
    selecting a first message from a plurality of messages which are stored in advance so as to be correlated with call results which indicates a result of connecting a call from the calling terminal to the called terminal, on the basis of the acquired call result; and transmitting the selected first message to the called terminal, wherein the call result correlated with the message which is stored in the message server indicates a case where the called terminal receives a call from the calling terminal, and talking is established.

15. A non-transitory computer readable storage medium that stores a program for controlling a message server connected to a calling terminal making makes a call and to a called terminal being able to receive a call from the calling terminal, the program causing a computer to execute a method of:

acquiring a call result, selecting a first message from a plurality of messages which are stored in advance so as to be correlated with call results which indicates a result of connecting a call from the calling terminal to the called terminal, on the basis of the acquired call result; and transmitting the selected first message to the called terminal, wherein the call result correlated with the message stored in the message server indicates a case where the called terminal receives a call from the calling terminal, and talking is established.

* * * * *